United States Patent [19]

Dinger

[11] 4,429,533
[45] Feb. 7, 1984

[54] SUPERCHARGED INTERNAL COMBUSTION ENGINE WITH TWO CONTROLLABLE EXHAUST GAS TURBOCHARGERS

[75] Inventor: Hans Dinger, Friedrichshafen, Fed. Rep. of Germany

[73] Assignee: MTU-Motoren- und Turbinen-Union Friedrichshafen GmbH, Friedrichshafen, Fed. Rep. of Germany

[21] Appl. No.: 280,201

[22] Filed: Jul. 6, 1981

[30] Foreign Application Priority Data

Dec. 12, 1980 [DE] Fed. Rep. of Germany ....... 3046874

[51] Int. Cl.³ .............................................. F02B 37/00
[52] U.S. Cl. ......................................... 60/606; 60/612
[58] Field of Search .................................. 60/606, 612

[56] References Cited

U.S. PATENT DOCUMENTS 4,299,090 11/1981 Deutschmann ........................ 60/612

FOREIGN PATENT DOCUMENTS 182786 3/1923 United Kingdom ................... 60/612
2034815 6/1980 United Kingdom ................... 60/612

*Primary Examiner*—Michael Koczo
*Attorney, Agent, or Firm*—Craig & Burns

[57] ABSTRACT

An internal combustion engine supercharged by exhaust turbochargers, with the engine being provided with an auxiliary combustion chamber, the exhaust gas of which is temporarily fed to a turbine of an exhaust gas turbocharger for improving acceleration characteristics of the internal combustion engine. The combustion air for the auxiliary combustion chamber is derived from a stream of supercharging air produced by the exhaust turbocharger. At least two exhaust turbochargers are provided with compressors thereof both conveying or feeding into a supercharging air conduit, to all cylinders of the internal combustion engine. Each of the compressors are equipped on an intake side with one check valve. During an idling or partial load, the exhaust gas of the internal combustion engine is fed to only one of the two exhaust turbochargers, wherein a conveying air stream produced by this exhaust turbocharger effects an automatic closing of the check valve of the other exhaust turbocharger. For accelerating the internal combustion engine, the exhaust gas from the auxiliary combustion chamber, ignited for this purpose and operating under a full load, is fed to the other exhaust turbocharger, which is capable of fully taking over a supply of the auxiliary combustion chamber and the internal combustion engine with combustion air, wherein the conveyed air stream produced at this point by this exhaust turbocharger effects an automatic closing of the check valve in the one exhaust turbocharger. The exhaust gas stream produced by the internal combustion engine, increasing during acceleration, effects in the exhaust turbocharger fed therewith finally such an increased conveyance of air that the check valve associated with this exhaust turbocharger is opened again and the exhaust turbocharger is capable of increasingly the participating in the air supply for the internal combustion engine and auxiliary combustion chamber. After the internal combustion engine has been accelerated to a desired rotational speed, the auxiliary combustion chamber is extinguished or throttled back to a readiness state of operation.

10 Claims, 1 Drawing Figure

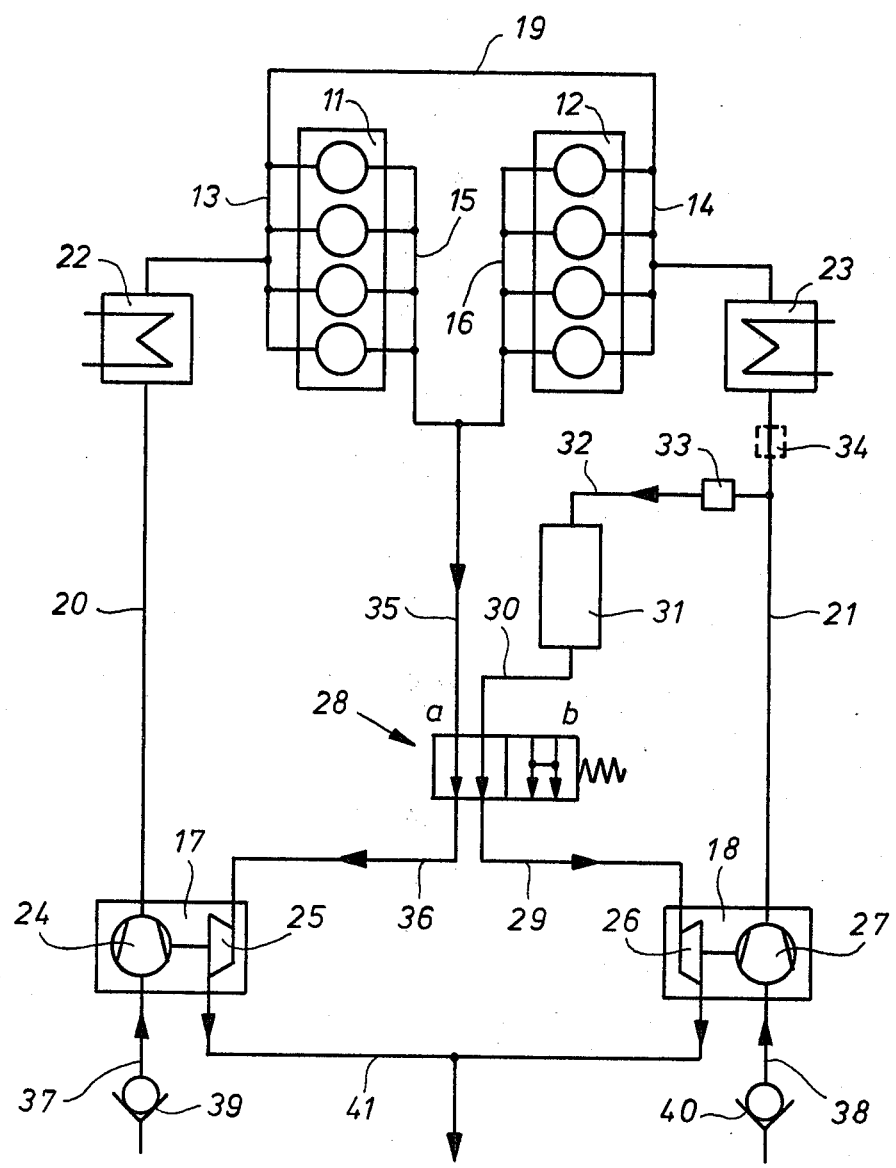

SUPERCHARGED INTERNAL COMBUSTION ENGINE WITH TWO CONTROLLABLE EXHAUST GAS TURBOCHARGERS

The present invention relates to an internal combustion engine and, more particularly, to a supercharged internal combustion engine which includes exhaust gas turbochargers and an auxiliary combustion chamber, whose exhaust gases are temporarily fed to a turbine of the exhaust gas turbocharger for improving the acceleration characteristic of the internal combustion engine, and in which the combustion air for the auxiliary combustion chamber is taken from the charging air flow produced by the exhaust gas turbocharger.

For the purpose of improving the acceleration characteristics of an internal combustion engine, two different systems have been proposed. The operating principle of these systems resides in raising the energy content of the exhaust gas stream, produced by the internal combustion engine during idling or low partial load, prior to entering the turbine of the exhaust gas turbocharger. By means of the energy-enriched exhaust gas, a rapid increase in the number of revolutions or rotational speed of the exhaust gas turbocharger and/or a rapid pressure build-up in the supercharging air system of the internal combustion engine is attained.

In one of the above noted proposed systems, the exhaust gas of the internal combustion engine flows through an auxiliary combustion chamber. In the auxiliary combustion chamber, the temperature and quantity of the exhaust gases are increased by feeding fuel which combusts with the residual oxygen contained in the exhaust gas. However, a disadvantage of this proposed system resides in the fact that the combustion characteristic of the auxiliary combustion chamber is unstable due to the pulsating exhaust gas stream from the internal combustion engine and may even lead to an extinction of the auxiliary combustion chamber.

In the other above-noted proposed system, the auxiliary combustion chamber is not fed with exhaust gases but instead with fuel and with combustion air branched off from a supercharging air stream for the internal combustion engine. The hot gas produced in the auxiliary combustion chamber is then admixed to the exhaust gas stream from the internal combustion engine prior to entrance into a turbine of the exhaust gas turbocharger. While this proposed system makes it possible to realize a stable operation of the auxiliary combustion chamber and to appreciably improve the acceleration characteristic of the internal combustion engine, a grave disadvantage resides in the fact that with an optimum adaptation of the system, that is, internal combustion engine plus auxiliary combustion chamber, the normal operation of the internal combustion engine without support by the auxiliary combustion chamber is very unsatisfactory.

The aim underlying the present invention essentially resides in providing an operationally reliable system of a supercharged internal combustion engine with an auxiliary combustion chamber which improves the acceleration characteristics of the engine.

The underlying problems are solved in accordance with the present invention in that the compressors of two exhaust gas turbocharges which both feed into a charging air conduit common to all cylinders of the internal combustion engine, are equipped on the intake side with one check valve each, in that during idling or partial load, the exhaust gas of the internal combustion engine is fed to only one of the two exhaust gas turbochargers, whereby the supplied air stream leaving this exhaust gas turbocharger effects an automatic closing of the check valve of the other exhaust gas turbocharger, in that for accelerating the internal combustion engine, the exhaust gases from the auxiliary combustion chamber, ignited for this purpose and operating under full load, are fed to the other exhaust gas turbocharger, which as a result thereof is thereby capable of completely taking over the supply of the auxiliary combustion chamber and of the internal combustion engine with combustion air, whereby the supplied air stream now leaving this exhaust gas turbocharger effects the automatic closing of the check valve associated with the one exhaust gas turbocharger; in that the exhaust gas stream produced by the internal combustion engine, which increases during acceleration, finally effects in the exhaust gas turbocharger fed therewith such an increased air supply that the check valve associated with this exhaust gas turbocharger on the intake side thereof is opened again and the exhaust gas turbocharger is now capable of increasingly participating in the air supply for the internal combustion engine and the auxiliary combustion chamber; and in that after acceleration of the internal combustion engine to the desired rotational speed, the auxiliary combustion chamber is extinguished or throttled back to readiness operation by conventional control means.

In accordance with a further advantageous feature of the present invention, the division of the supercharging air stream between the auxiliary combustion chamber and the internal combustion engine takes place by at least one adjustable control device.

The advantages achieved with the present invention consist in particular in that a marked reduction is achieved in the time span required for accelerating the internal combustion engine from idling to full load results compared with supercharged internal engines without an auxiliary combustion unit, in that an operation of the auxiliary combustion chamber uninfluenced by the exhaust gas pulsation of the internal combustion engine is made possible, in that by elimination of the trouble location, which is represented by the arrangement for the convergence of the exhaust gas mass streams from the internal combustion engine and from the auxiliary combustion chamber operated at full load, the exhaust gas line of the internal combustion engine can now be designed and constructed for an optimum flow conductance, and in that a short acceleration period is attainable for the internal combustion engine.

Accordingly, it is an object of the present invention to provide an internal combustion engine which avoids, by simple means, the aforementioned shortcomings and disadvantages encountered in the prior art.

Another object of the present invention resides in providing a supercharged internal combustion engine which significantly improves the acceleration characteristics of the engine.

Another object of the present invention resides in a supercharged internal combustion engine which enables the engine to function realiably under all operating loads.

A still further object of the present invention resides in a supercharged internal combustion engine which is simple in construction and therefore relatively inexpensive to manufacture.

These and other objects, features and advantages of the present invention will become more apparent from the following description when taken in connection with the accompanying drawing which shows, for the purposes of illustration only, one embodiment in accordance with the present invention, and wherein:

The single FIGURE is a schematic view of a supercharged internal combustion engine constructed in accordance with the present invention.

Referring now to the single FIGURE in the drawing, according to FIGURE, an internal combustion engine provided with two rows of cylinders 11, 12, which include each a charging air line 13, 14 and an exhaust gas line 15, 16, is supplied with precompressed charging air by exhaust gas turbochargers 17, 18. An overflow line 19 is provided connecting the charging air lines 13, 14 with each other. One supercharging air cooler each 22, 23 is connected in the charging air feed lines 29, 21 coming from the compressors 24, 27 of the exhaust gas turbochargers 17, 18 upstream of the charging air lines 13, 14. One check valve 39, 40 each is arranged in the intake lines 37, 38 of the compressors 24, 27. The check valve 39 or 40 closes automatically as soon as the associated compressor is no longer capable of feeding against the pressure prevailing in the charging air system of the internal combustion engine. The exhaust gas lines 15, 16 are connected with the turbines 25, 26 of the exhaust gas turbocharger 17, 18 by way of a shifting or switching unit generally designated by reference numeral 28 which is of conventional construction, for example, a conventional shifting valve that has switching positions "a" and "b". An auxiliary combustion chamber 31 to which combustion air is fed from the charging air feed line 21 by way of a line 32, is also connected with its exhaust line 30 to the shifting unit 28. A control device 33 of conventional construction which is adjustable to zero feed, is provided at least in the line 32 for regulating the stream of combustion air for the auxiliary combustion chamber 31. The control device 33 may additionally be assisted by a further control device 34 arranged in the supercharging air supply line 21.

During normal operation when the internal combustion engine operates at a low or idling load, the switchover unit 28 is in the position "a". The closed control device 33 blocks the air supply to the auxiliary combustion chamber 31 and the exhaust gases of the internal combustion engine are conducted by way of lines 35, 36 only to the exhaust gas turbocharger 17, which alone takes care of the supply of charging air to the internal combustion engine by means of its compressor 24 by way of the charging air supply line 20. Since the exhaust gas turbocharger 18 is inoperable, i.e., the compressor 27 does not supply any air, the check valve 40 closes under the effect of the charging air pressure built up by the compressor 24 in the charging air system of the internal combustion engine.

For an impending case of acceleration, i.e., if it can be foreseen that the internal combustion engine must be ready for a rapid increase in the rotational speed from an idling or from a partial load condition, the auxiliary combustion chamber 31 is ignited after opening of the control device 33 in the position "a" of the switchover unit 28, and the exhaust gas from the auxiliary combustion chamber 31 is fed by way of the exhaust line 30, the switchover unit 28, and the exhaust gas 29 to the turbine 26 of the exhaust gas turbocharger 18. The exhaust gas turbocharger 18 is thereby subjected to an increase in the rotational speed thereof which, under a full load operation of the auxiliary combustion chamber 31, is finally sufficiently great to enable the turbocharger 18 to feed against the pressure in the supercharging air system of the internal combustion engine built up by the compressor 24 of the exhaust gas turbocharger 17. As a result thereof, the check valve 40 is finally opened, whereas the check valve 39 closes when the supply of the compressor 27 exceeds the supply of the compressor 24.

With the assist provided by the auxiliary combustion chamber 31, the exhaust gas turbocharger 18 is finally capable of taking over the sole charging air supply of the internal combustion engine and the supply of combustion air for the auxiliary combustion chamber 31. Independent of the production of exhaust gas of the internal combustion engine, a substantially larger charging air mass stream can be produced by the exhaust gas turbocharger 18 with the assistance of the auxiliary combustion chamber 31 than corresponds to the instantaneous power level of the internal combustion engine. This excess of air permits an increase of the fuel supply for the internal combustion engine, required for the acceleration, whose exhaust gas production increases correspondingly which, in turn, means an increase in power for the exhaust gas turbocharger 17. With the exhaust gas mass stream from the internal combustion engine, which increases during acceleration, the exhaust gas turbocharger 17 is finally capable of increasingly partaking in the charging air supply of the internal combustion engine and of the auxiliary combustion chamber 31 whereby the check valve 39 is then again fully opened.

After the internal combustion engine has been accelerated to the desired speed or the output limit of the internal combustion engine has been reached, up to which the exhaust gas turbocharger 17 is capable of absorbing alone the exhaust gas mass stream of the internal combustion engine, the auxiliary combustion chamber 31 is extinguished or is throttled back into a readiness power condition. At the same time, the switchover unit 28 is shifted into the position "b", in which the exhaust gas from the internal combustion engine is distributed onto both exhaust gas turbochargers 17, 18.

During a readiness power operation of the auxiliary combustion chamber 31, the exhaust gas production is only small as compared with the full load operation. The feeding of this small amount of exhaust gas from the exhaust gas line 30 to the exhaust gas mass stream of the internal combustion engine does not impair the operation of the internal combustion engine.

As can readily be appreciated, the combining of the exhaust gas line 15, 16 into the or line 35 upstream of the switchover unit 28 is not the only possible arrangement. For example, the exhaust gas lines 15 and 16 may also be extended separately up to the switchover unit 28 by omission of the line 35 and may combine inside of the switchover unit 28 when the unit 28 is in the position "a" so as to supply in unison the line 36 with exhaust gases. As a result thereof, the branching of the line paths for the exhaust gas from the internal combustion engine is eliminated in the position "b" of the switchover unit 28. In the switchover unit 28, position "b", one flow path each is then respectively provided for the connection of the exhaust gas line 15 with the line 36 and of the exhaust gas line 16 with the line 29. The exhaust gas stemming from the readiness operation of the auxiliary combustion chamber 31 is fed, in this arrangement, to one of the two exhaust gas turbochargers 17, 18 or is directly conducted into an exhaust pipe 41 of the internal combustion engine in by-passing relationship with the exhaust gas turbochargers 17, 18.

For the sake of clarity, the switchover unit 28 is illustrated as a closed or integrated unit; however, it is likewise possible to utilize separate switchover devices for the conduits or lines controlled by the switchover unit 28.

While I have shown and described only one embodiment in accordance with the present invention, it is understood that the same is not limited thereto but is susceptible of numerous changes and modifications as known to one having ordinary skill in the art and I therefor do not wish to be limited to the details shown and described herein, but intend to cover all such modifications as are encompassed by the scope of the appended claims.

I claim:

1. An internal combustion engine comprising means for providing a supply of supercharging air for the engine, and an auxiliary combustion chamber means for improving the acceleration characteristic of the engine, characterized in that the means providing a supply of supercharging air includes at least two exhaust gas turbocharger means, each of the turbocharger means includes a compressor means and a turbine means, each of the compressor means is provided with an intake means, a check valve means being arranged in each of the intake means, means for supplying all of the exhaust gases from the engine to only one of the turbocharger means during an idling or partial load operation of the engine so that the compressor means of said one of the turbocharger means produces an air stream for effecting an automatic closing of the check valve means in the intake means of the other of said turbocharger means, means for enabling the auxiliary combustion chamber means to operate at full load during an acceleration of the engine, means for supplying exhaust gases from the auxiliary combustion chamber means to said other of said turbocharger means so as to enable the same to fully take over the supply of air to the auxiliary combustion chamber means and the engine, with the air produced by the compressor means of said other of a turbocharger means automatically effecting a closing of the check valve means in the intake means of said one turbocharger means.

2. An internal combustion engine according to claim 1, characterized in that during acceleration of the engine, when the other turbocharger means takes over the supply of air to the combustion chamber means and to the engine, the increase in the exhaust gas stream from said engine which is supplied to said one turbocharger means, is operable to cause said one turbocharger means to provide a supply of compressed air which is increased to such an extent that the check valve means in the intake means of said one of the turbocharger means is opened again so as to enable said one of the turbocharger means to increasingly participate in the supply of air to the engine and auxiliary combustion chamber means.

3. An internal combustion engine according to claim 2, characterized in that control means are provided for controlling the supply of a portion of supercharging air to the auxiliary combustion chamber means so as to maintain the auxiliary combustion chamber means in a ready operational state after the engine has been accelerated to a desired rotational speed.

4. An internal combustion engine according to claim 3, characterized in that said control means for controlling the supply of a portion of the supercharging air to the auxiliary combustion chamber means is a control element operable to extinguish the auxiliary combustion chamber means.

5. An internal combustion engine according to claim 3, characterized in that said control means for controlling the supply of a portion of the supercharging air to the auxiliary combustion chamber means is an adjustable throttle element operable to subdivide the supply of supercharging air between the auxiliary combustion chamber means and the engine.

6. An internal combustion engine according to claim 5, characterized in that a common charging air conduit means is provided for supplying supercharging air to all cylinders of the engine, and in that the compressor means of both turbocharger means supply supercharging air to the common conduit means.

7. An internal combustion engine including exhaust gas turbocharger means having turbine and compressor means for supercharging the engine, and an auxiliary combustion chamber means, whose exhaust gases are fed temporarily to only one of the turbine means of the exhaust gas turbocharger means for improving the acceleration characteristics of the engine, and in which combustion air for the auxiliary combustion chamber means is taken from the compressor means of one of said turbocharger means, characterized in that (a) two exhaust gas turbocharger means are provided, both of which feed into a charging air line common to all cylinders of the engine and each which includes an intake side, and a check valve means on the intake side of each compressor means;

(b) during idling or partial load, a control valve means is operable to feed the exhaust gases of the internal combustion engine to only one of the two turbocharger means, the air flow supplied by said one turbocharger means effecting an automatic closing of the check valve means associated with the other turbocharger means;

(c) for accelerating the engine, a control means is operable to ignite the combustion chamber means and to feed the exhaust gases of the auxiliary combustion chamber means to the other turbocharger means, which as a result thereof, is able to assume the complete supply of combustion air for the auxiliary combustion chamber means and for the engine, the air flow thus supplied by said other exhaust gas turbocharger means effecting the automatic closing of the check valve means associated with said one exhaust gas turbocharger means;

(d) the exhaust gas flow from the engine increases with acceleration and thereby eventually causes an increased air feed in said one exhaust gas turbocharger means so that the check valve means associated with the intake side thereof again opens and said one exhaust gas turbocharger means is able to increasingly participate in the air supply of the engine and of the auxiliary combustion chamber means;

(e) after acceleration of the engine to the desired rotational speed, said control means being operable to reduce the output of the auxiliary combustion chamber means.

8. An internal combustion engine according to claim 7, in which said control means is operable to extinguish said combustion chamber means after acceleration of the engine to the desired speed.

9. An internal combustion engine according to claim 7, in which said control means is operable to reduce the output of the auxiliary combustion chamber means to readiness output after acceleration of the engine to the desired speed.

10. An internal combustion engine according to claim 7, further comprising adjustable throttling means for subdividing the charging air stream between the auxiliary combustion chamber means and the engine.

* * * * *